United States Patent [19]
Blackwell et al.

[11] Patent Number: 5,154,744
[45] Date of Patent: * Oct. 13, 1992

[54] METHOD OF MAKING TITANIA-DOPED FUSED SILICA

[75] Inventors: Jeffery L. Blackwell; Carlton M. Truesdale, both of Corning, N.Y.

[73] Assignee: Corning Incorporated, Corning, N.Y.

[ * ] Notice: The portion of the term of this patent subsequent to Aug. 27, 2008 has been disclaimed.

[21] Appl. No.: 750,616

[22] Filed: Aug. 26, 1991

[51] Int. Cl.[5] ............................................. C03C 25/02
[52] U.S. Cl. ....................................... 65/3.12; 65/18.2; 65/18.4; 65/901; 65/2; 427/163; 427/452
[58] Field of Search ...................... 65/3.12, 18.2, 18.4, 65/60.52, 2, 901; 427/163, 167, 255, 255.3, 423

[56] References Cited

U.S. PATENT DOCUMENTS

| | | | |
|---|---|---|---|
| 3,933,162 | 1/1976 | Blankenship | 427/163 |
| 4,501,602 | 2/1985 | Miller et al. | 65/18.2 |
| 4,768,859 | 9/1988 | Kasori et al. | 501/59 |
| 4,877,306 | 10/1989 | Lar | 427/163 |
| 4,915,988 | 4/1990 | Erbil | 427/255.3 |
| 5,043,002 | 8/1991 | Dobbins et al. | 65/3.12 |
| 5,067,975 | 11/1991 | Backer et al. | 65/18.2 |

FOREIGN PATENT DOCUMENTS

| | | | |
|---|---|---|---|
| 56-114904 | 9/1981 | Japan | 65/901 |
| 56-164023 | 12/1981 | Japan | 65/901 |
| 60-90838 | 5/1985 | Japan . | |

OTHER PUBLICATIONS

Hough, Chemical Vapor Deposition of Metal Oxides from Organometallics, Apr. 1972, 3rd Inter. Conference on CVD, pp. 232–241.

Primary Examiner—Kenneth M. Schor
Assistant Examiner—John J. Bruckner
Attorney, Agent, or Firm—C. S. Janes, Jr.

[57] ABSTRACT

This invention relates to production of high purity fused silica glass doped with titania through oxidation or flame hydrolysis of a gaseous mixture and containing rutile crystals comprising a vaporizable, silicon-containing compound. Titanium-2-ethylhexyloxide, titanium cyclopentyloxide, and a titanium amide, or a combination thereof, constitute the operable titanium-containing compounds.

15 Claims, 3 Drawing Sheets

SURFACE

METHOD OF MAKING TITANIA-DOPED FUSED SILICA

RELATED APPLICATIONS

U.S. Pat. Application Ser. No. 07/568,230, filed Aug. 16, 1990, now U.S. Pat. No. 5,043,002, by M.S. Dobbins et al. under the title METHOD OF MAKING FUSED SILICA BY DECOMPOSING SILOXANES, is directed to the production of high purity fused silica glass through oxidation or flame hydrolysis of vaporizable, halide-free compounds in said production. In the preferred practice, a polymethylcyclosiloxane comprises said vaporizable, halide-free compound.

J. L. Blackwell et al. U.S. Pat. application Ser. No. 07/750,561, filed concurrently herewith under the title METHOD OF MAKING FUSED SILICA, is a Continuation-In-Part of U.S. Pat. Application Ser. No. 07/568,230, filed Aug. 16, 1990, now U.S. Pat. No. 5,043,002, and is likewise directed to the production of high purity fused silica glass through the thermal decomposition with oxidation or flame hydrolysis of halide-free, silicon-containing compounds. In the preferred practice, a halide-free, silicon-containing compound is selected from the group consisting of an organosilicon-oxygen compound, an organosilicon-nitrogen compound, a siloxasilane, and a mixture thereof.

BACKGROUND

Silicon, germanium, zirconium, and titanium are metals often used in chloride form as vaporous reactants for forming high purity metal oxide glasses. A pernicious by-product of such reactants is hydrochloric acid (HCl). The corrosive nature of HCl necessitates periodic replacement of the equipment having had prolonged contact with the acid. In addition, the enhanced global sensitivity to environmental protection has led to more strict government regulation of point source emissions; thus it is no longer acceptable to release environmentally pernicious gases, such as HCl, into the atmosphere without abatement.

Compliance with such standards has burdened industry with the task of containing, and properly disposing of, such pollutants. At present, vaporous exhausts, such as HCl, are treated with elaborate, and very expensive, cleansing systems that remove particulate matter from exhaust gases before they are released into the atmosphere. In addition, the periodic maintenance of equipment necessitated by the corrosive nature of HCl utilizes thousands of man-hours, as well as the consequential loss of manufacturing productivity.

The inventive solution proposed in U.S. Pat. Application Ser. No. 07/568,230, filed Aug. 16, 1990, now U.S. Pat. No. 5,043,002, is to use halide-free feedstocks, preferably a polymethylcyclosiloxane, and most preferably octamethylcyclotetrasiloxane (OMCTS), in these processes for producing metal oxides, thus eliminating the production of HCl as a by-product. The advantages of operating under a chloride-free system include: reduced pollution abatement requirements; reduced equipment losses and maintenance due to the corrosive nature of HCl; and increased manufacturing productivity. Likewise, the long term, adverse environmental effects inherent in producing large boules of high purity metal oxide glass or large blanks of soot from which optical fiber is drawn, are reduced significantly as fused silica glass produced by oxidation of OMCTS results in the production of carbon dioxide and water as essentially the sole by-products.

The instant invention is directed toward the doping of metal oxide glasses, particularly glasses used in the fabrication of optical fiber, by oxidation or flame hydrolysis of a halide-free, organometallic compound in vapor form. In this manner, metal oxide glasses may be doped in the manner described by Dobbins et al., while still catering to the environmental concerns addressed therein. Therefore, it is an object of the instant invention to provide a chloride-free, organometallic compound that is suitable for doping metal oxide glasses.

Optical fiber having one or more outer layers doped with titania has been shown to exhibit superior strength, as compared to homogeneous silica clad fibers. Superior strength is desirable in optical fiber as it reduces the potential for rupture and consequential replacement. It is a further object of the instant invention to provide a method of making doped optical fiber with superior strength as compared to standard silica clad optical waveguides.

Conventional methods for producing fiber clad with titania-doped outer layers utilize what is described in the art as a bump layer. For example, in U.S. Pat. Application Ser. No. 07/456,141 entitled METHOD OF MANUFACTURING OPTICAL WAVEGUIDE FIBER WITH TITANIA-SILICA OUTER CLADDING, filed Dec. 22, 1989 by Backer et al. now U.S. Pat. No. 5,067,975, and U.S. Pat. Application Ser. No. 07/456,140 entitled OPTICAL WAVEGUIDE FIBER WITH TITANIA-SILICA OUTER CLADDING, also filed Dec. 22, 1989 by Backer et al., a method of making a fatigue resistant optical fiber is disclosed. These applications describe an optical fiber having a core, an inner cladding, and two outer claddings, one nominally about 8% by weight $TiO_2$ and a bump layer, with said bump layer comprising a $TiO_2$ concentration greater that 10.5 per cent by weight. The sole purpose of the bump layer is to control the loss of titania during consolidation. The present inventive technique eliminates the need for the bump layer without compromising the strength of the fiber. Said technique may also result in improved select rates of drawn optical fiber.

The teachings of the instant invention are easily adapted to known methods of producing high purity fused silica by flame pyrolysis or hydrolysis, such as those disclosed in the early patents by Nordberg (U.S. Pat. No. 2,239,551) in 1941 and Hyde (U.S Pat. 2,272,342) in 1942. It is anticipated that this process alteration may be adapted to a variety of deposition/collection techniques as well.

While it is recognized that the primary application of the instant invention relates to the doping of fused silica, the technology applied herein is generally applicable in instances where a high purity metal oxide glass is desired.

SUMMARY OF THE INVENTION

The instant invention is directed toward the doping of metal oxide glasses with titania being extracted from an organometallic compound in vapor form selected from the group consisting of titanium isopropoxide, $Ti(OC_3H_7)_4$, titanium ethoxide, $Ti(OC_2H_5)_4$, titanium-2-ethylhexyloxide, $Ti[OCH_2(C_2H_5)CHCH_4H_9]_4$, titanium cyclopentyloxide, $Ti(OC_3H_9)_4$, and the titanium amides, $Ti(NR^2)_4$, or a combination thereof. Embodied herein is a method of making titania-doped metal oxide glasses by using said organometallic compounds.

Said organometallic compounds may be easily incorporated into any system suitable for oxidation of metal oxides by pyrolysis or hydrolysis. In addition, titania-doped metal oxide glasses may be produced without producing environmentally pernicious by-products.

PRIOR ART

A plethora of patents have issued that describe the production of high purity metal oxides, and particularly fused silica, from a chloride-based feedstock encompassed in, or feeding into, a specialized piece of equipment. Such equipment has featured a number of burner arrangements and feedstock delivery systems, all based on the oxidation of a metal chloride through flame hydrolysis or pyrolysis.

Illustrative of this fact are U.S. Pat. No. 4,491,604 (Lesk et al.) wherein trichlorosilane, dichlorosilane, and silicon tetrachloride are flame hydrolyzed to form soot, and U.S. Pat. No. 3,666,414 (Bayer) wherein silicon halides, such as silicon chloroform, are flame hydrolyzed. In similar processes, U.S. Pat. Nos. 3,486,913 (Zirngibl) and 2,269,059 (McLachlan) teach of oxidation of halides: inorganic halide components in vapor form such as $TiCl_4$, $CrCl_3$, $CrO_2Cl_2$, $SiCl_4$, $AlCl_3$, $ZrCl_4$, $FeCl_2$, $FeCl_3$, $ZnCl_2$, or $SnCl_4$ oxidized with air, steam, or oxygen are employed in '913; while silicon halides and $AlCl_3$, $TiCl_4$, and $ZrCl_4$ are employed in '059.

U.S. Pat. No. 2,326,059 (Nordberg) details a technique for making silica-rich, ultra-low expansion glass by vaporizing tetrachlorides of Si and Ti into the gas stream of an oxy-gas burner, depositing the resultant mixture to make a preform, vitrifying the preform at 1500° C. to make an opal glass, and firing the opal preform at a higher temperature to cause it to become transparent. Unlike the instant invention, the stated reference does not employ the use of halide-free, titanium-containing source compounds.

U.S. Pat. No. 4,501,602 (Miller et al.) describes the production of glass and glass/ceramic articles via a vapor phase oxidation process wherein β-diketonate complexes of metals selected from Groups IA, IB, IIA, IIB, IIIA, IIIB, IVA, IVB, and the rare earth series of the Periodic Table are vaporized, the vapor is transported to an oxidation site, such as a burner or a hot plasma zone which is adjacent to a deposition substrate or within a deposition tube, and oxidized in the vapor phase to form particulate metal oxide soot. β-diketonate complexes are also available of metals in Group VA of the Periodic Table, notably tantalum and vanadium. Miller et al. did not refer to the halide-free, titanium-containing source compounds employed in the present invention.

Japanese Patent Application No. 90838-1985, entitled MANUFACTURING METHOD OF QUARTZ GLASS PREFORM FOR OPTICAL TRANSMISSION, (Okamoto et al.) discloses a method of doping quartz glass by utilizing an ester silane expressed by the general formula $R^1nSi(OR^2)_{4-n}$ and one or more dopants defined by the formulas $Ge(OR^3)_3$, $B(OR^3)_3$, and $PH_3$, where $R^1$ is a hydrogen atom, methyl or ethyl group; $R^2$ is a methyl or ethyl group; $R^3$ is an univalent hydrocarbon group; and n is an integer ranging between 0 and 4. A plethora of organometallic compounds are disclosed including methyltrimethoxysilane, dimethyldimethoxysilane, trimethylmethoxysilane, tetramethoxysilane, methyltriethoxysilane, and tetraethoxysilane, though none of the halide-free titania-containing source compounds of the instant invention are mentioned.

PREFERRED EMBODIMENTS

Figure 1:
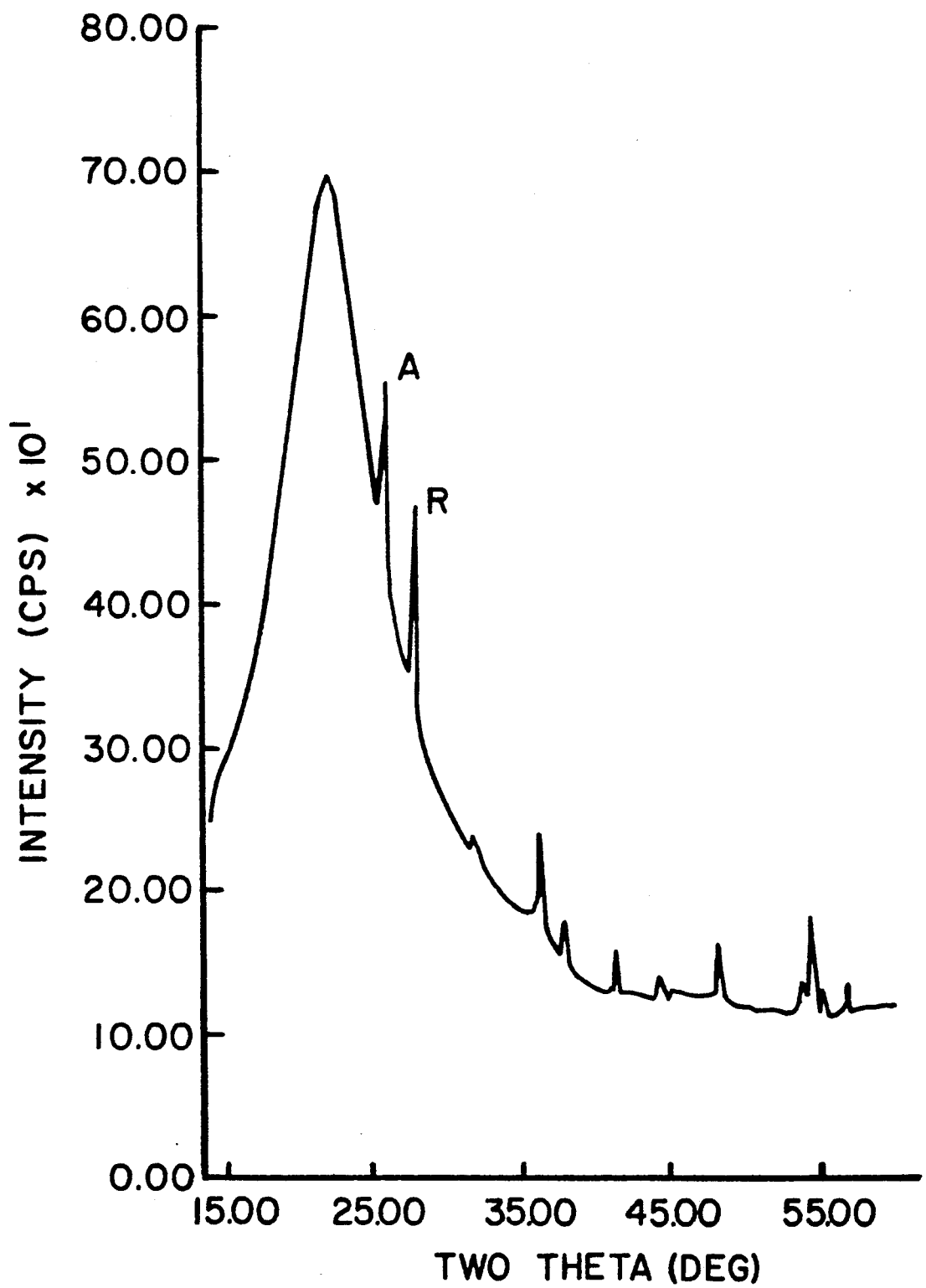
FIG. 1 is an x-ray diffraction pattern of the surface layer of a silica blank or preform doped with titania, from which the intensity peaks of the rutile and anatase crystalline phases of titania are evident.

In the preferred embodiment of the instant invention, titanium isopropoxide, $Ti(OC_3H_7)_4$, titanium ethoxide, $Ti(OC_2H_5)_4$, or a combination thereof, is used to dope metal oxide glasses. In the most preferred embodiment titanium isopropoxide, titanium ethoxide, or a combination thereof, is used to produce the titania-doped silica outer cladding layer or layers found in optical fiber with superior fatigue resistance performance as compared to standard silica clad optical waveguides. The application of the titanium-based, organometallic compounds of the instant invention as dopants to conventional methods of making optical fiber is easy and inexpensive to implement.

Most of the processes being developed by industry today for the manufacture of optical waveguides employ the chemical vapor depositon (CVD) concept or a modified version thereof. In a CVD experiment, each of the component liquids is heated to a constant temperature at which enough vapor pressure is generated to produce a reasonable rate of deposition. The individual vapors are entrained in a carrier gas stream, mixed together prior to combustion to ensure homogeneous output, and then passed through a burner flame, usually a natural gas/oxygen mixture which frequently contains excess oxygen. The vapors in the mixture are converted to their respective oxides upon exiting the burner orifice to form a stream of volatile gases and finely-divided, amorphous, spherical aggregates, called soot. The soot is collected on a support, for example, on a mandrel (called outside vapor deposition), or on the surface of a bait tube (called axial vapor deposition), and deposited in thin layers. The final product of soot collection, the porous preform, is then subjected to high temperature in which the preform consolidates to a non-porous monolithic glassy body.

In usual practice, the optical waveguide process is a three-step process. In the first stage of optical fiber fabrication, oxygen, the carrier gas, is bubbled through a liquid feedstock of $SiCl_4$ that is maintained at a constant temperature. The resulting vaporous reactant is transported to a reaction site, such as a burner, via a carrier gas, wherein the vaporous gas streams are combusted in a burner flame fueled with natural gas and oxygen. The presence of oxygen serves to convert the vaporous reactants to their respective oxides upon exiting the burner orifice to form a stream of volatile gases and finely-divided, spherical particles of soot that are deposited onto a substrate, forming a porous blank or preform of opaque, white silica soot. Water, HCl, and carbon dioxide are emitted as byproducts of this reaction.

In the second stage the blank or preform is subsequently heat treated in a helium/chlorine atmosphere to full consolidation. In the third and final stage, conventional fiber-draw technology is utilized in pulling optical waveguide fiber from the preform.

The incorporation of titanium isopropoxide, as well as the other organometallic compounds of the instant invention, into such a system only requires an additional means of transporting a vaporous reactant to the burner site. Such a system modification can be met with minimal resources and/or expense.

An added advantage of using titanium isopropoxide in producing titanium-doped optical fiber is that the titania layer produced exhibits minimal depletion. Depletion, i.e., the migration and loss of titanium ions during consolidation, is an area of concern when producing fiber with good fatigue resistance. Previous methods of minimizing depletion have employed the bump layer wherein 4-8% depletion of titania has been observed in blanks after being consolidated in a 99:1 helium:chlorine environment. Less than 1% depletion has been observed in blanks doped with titanium isopropoxide that are consolidated in the same environment.

The depletion resistant character of titania-doped fiber made from titanium isopropoxide may be explained by the flame chemistry and crystalline phases of titania. Thus, conventionally, anatase, a low temperature polymorph of titania in the form of submicroscopic crystals, has been the primary crystal phase seen via x-ray diffractometry in the blank doped with titania made by oxidizing $TiCl_4$. In the amorphous silica matrix, anatase is converted to rutile, a high temperature phase of titania, at around 1600°-1650° C., after which rutile does not reconvert to anatase. Rutile is known to have a much smaller surface area as determined by surface area analysis. Both of these tetragonal crystals are usually produced during the flame hydrolysis of $TiCl_4$ with anatase being the dominant phase, however. Because of its smaller surface area, it is expected that rutile would be less reactive to chlorine than anatase during the consolidation of a blank.

One explanation for the difference in the identity of the predominant crystalline phase produced by titanium isopropoxide (and the other operable titanium-containing organometallic compounds) is that its fuel content produces a hotter flame than that compared to $TiCl_4$. The combustible nature of titanium isopropoxide produces a hotter flame at the burner, thus producing soot at a higher temperature. This phenomenon is thought to be the catalyst providing the predominance of one phase of titania, rutile, over another, anatase, during soot casting when using titanium-containing organometallic compounds as feedstocks.

It should be noted, however, that, in usual practice of preparing optical fiber, the fiber is quenched during the draw process, thus eliminating the existence of anatase and/or rutile $TiO_2$ crystals, leaving fiber in the glassy state.

Although, as has been explained above, the present inventive technology can be applied by utilizing various systems of oxidation through hydrolysis and/or pyrolysis, such as the bubbler, the preferred method for use in the large scale commercial production of optical fiber involves a flash vaporizer for generating soot. This practice is depicted in the Example below.

EXAMPLE

Titanium isopropoxide was used to fabricate the outer layer of silica fibers. Titanium isopropoxide has a boiling point of 232° C. and is stored under nitrogen because it reacts readily with water. The flash vaporizer was heated and controlled at 175° C., the boiling point of octamethylcyclotetrasiloxane (OMCTS). OMCTS is the organometallic used to generate silica. The flash vaporizer has two separate channels: titanium isopropoxide is flashed off one to yield $TiO_2$; and OMCTS is flashed off the other to yield $SiO_2$. All fume lines are heated to 175° C. The bypass nitrogen carries the product through the vaporizer into the fume line and then on to the burner. Oxygen is added to the fume line. The burner premix is methane/oxygen. The delivery rate for OMCTS was 7.5 gm per minute and the delivery rate for the titanium isopropoxide was 2.8 gm per minute. This combination yielded a blank containing an average of 12 wt% titania.

Figure 2:
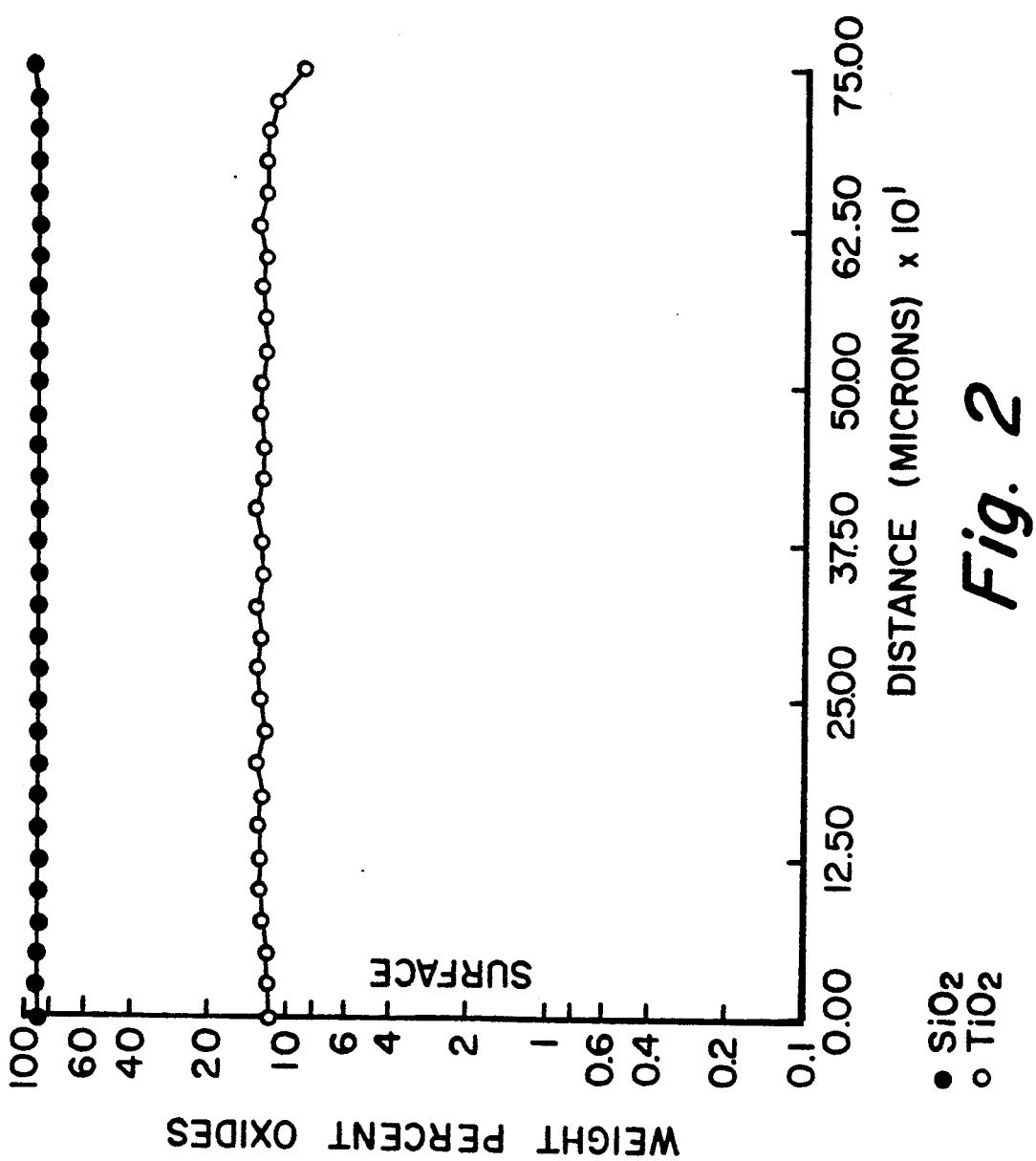
FIG. 2 is a microprobe analysis of the surface layer of a silica blank or preform doped with titania. This analysis demonstrates the minute amount of depletion at the surface.
Figure 3:
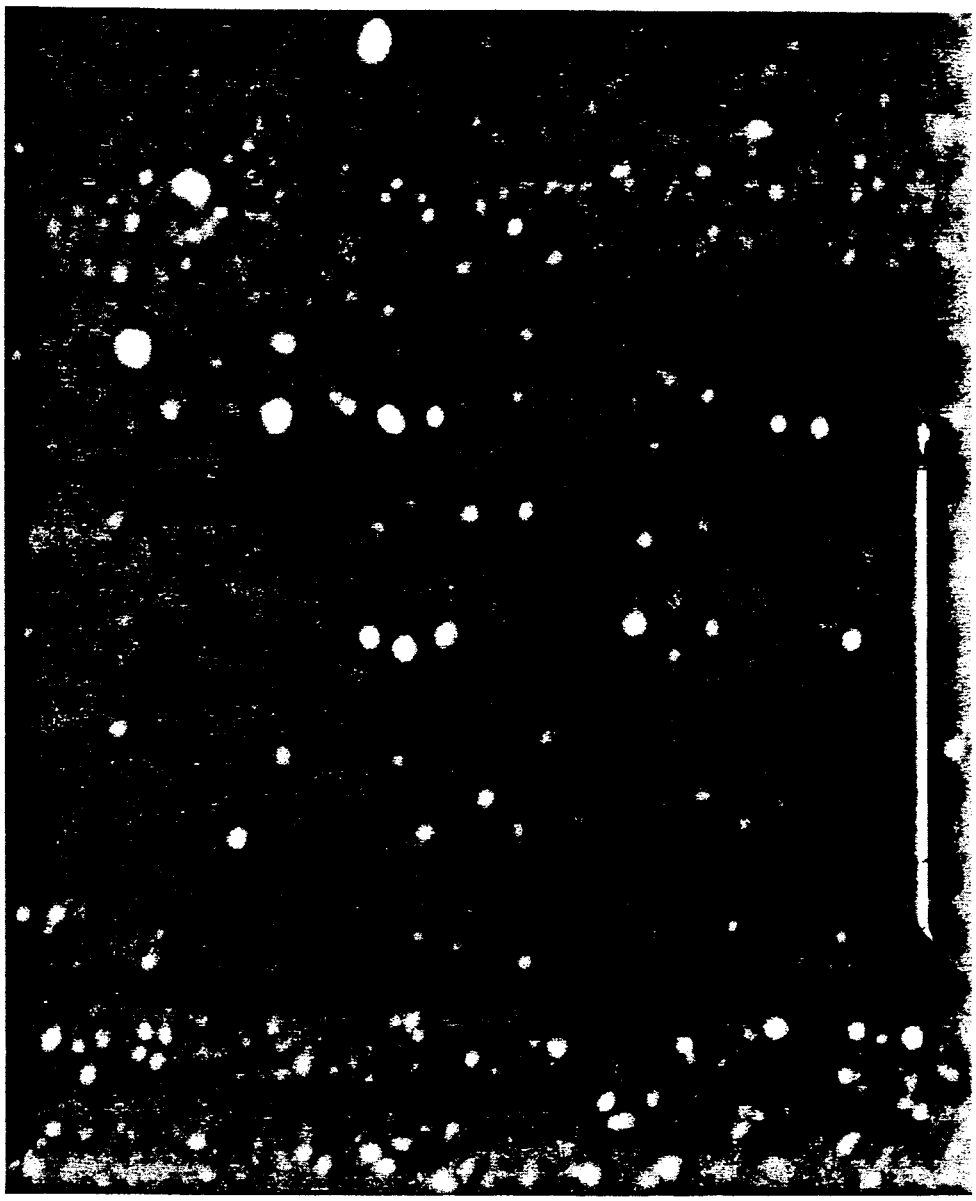
FIG. 3 is a photomicrograph of the surface and interior layers of a silica blank or preform doped with titania. The high concentration of $TiO_2$ crystals (virtual non-depletion) at the surface is demonstrated.

The titania/silica blank was dried in a consolidation furnace in the presence of 1% chlorine and 99% helium. Afterwards, the blank was drawn into fiber. As illustrated in FIG. 1, X-ray diffraction analyses of the surface layer have indicated that more rutile than anatase is present during laydown. As indicated in FIG. 2, microprobe analyses have demonstrated that the surface is depleted only 0.8% from an average value of 12.3% to 11.5% titania. An illustration of the crystal structure of the titania layers is shown in the photomicrograph displayed in FIG. 3. The white dots in the photomicrograph are submicroscopic crystals of rutile. (The white bar at the base of FIG. 3 represents 10 microns.) As can be seen from FIGS. 2 and 3, there is very little loss of $TiO_2$ from the surface of the layer; hence, no additional bump layer is necessary.

The properties of the titania-amides of the instant invention resemble those of the alkoxides, e.g., they are hydrolyzed rapidly by water and are sensitive to oxygen. It follows that they may serve as replacements for titanium isopropoxide and titanium ethoxide in synthesizing the titania-doped metal oxide glasses of the instant invention.

The ultimate test of the fiber is determined by characterizing the resultant fatigue resistance. The fatigue resistance mechanism is known to the art, and is characterized by the fatigue constant, n. A fatigue constant of 33.3 was measured, which compares favorably with the fatigue constant of ~31.5 typically observed in commercially available titanium-doped silica fiber.

These data indicate that there is no need to continue the standard practice of producing a secondary titania layer to negate the depletion of titania, as is indicated in the aforementioned patent applications filed by Backer et al. Since it is no longer necessary to fabricate the bump layer, it is expected that fiber draw selects will increase, rivaling those observed when producing standard silica-clad fibers.

The cost of OMCTS relative to $SiCl_4$ is approximately the same, based on the amount of silica deposited. Maximum soot collection efficiencies observed for $SiCl_4$ are typically on the order of 50-60 per cent or higher; the maximum deposition efficiency for an OMCTS-based process is hypothesized to be in the same range. Therefore, the same cost effectiveness is expected when titania-doped glass based on OMCTS is produced.

Likewise, the cost of the halide-free, titanium-containing compounds of the instant invention are minimal when compared to standard processing techniques whereby doping is achieved by using $TiCl_4$.

In optical waveguide production, deposition efficiency tends to increase with blank size. Once deposition begins collection efficiencies for $SiCl_4$ can be less than 10%, while OMCTS can yield initial deposition efficiencies up to 25%. This factor of 2.5 or greater in deposition efficiency gives a corresponding increase in preform growth rate for equivalent rates of silica deposited at the burner, and a 20% or so reduction, by weight, in soot that has to be cleaned from the exhaust gases. These benefits are also possible when titania-doped glass based on OMCTS is produced.

While the principles of the instant invention have been described above in connection with specific embodiments and particular modifications thereof, it is to be clearly understood that this description is made only by way of example, and not as a limitation on the scope of the invention. Said principles may be otherwise embodied within the scope of the following claims.

We claim:

1. In a method for making a non-porous body of high purity fused silica glass doped with titania comprising the steps of:
    (a) producing a gas stream containing a silicon-containing compound in vapor form capable of being converted through thermal decomposition with oxidation or flame hydrolysis to $SiO_2$ and a titanium-containing compound in vapor form capable of being converted through thermal decomposition with oxidation or flame hydrolysis to $TiO_2$;
    (b) passing said gas stream into the flame of a combustion burner to form amorphous particles of fused $SiO_2$ doped with $TiO_2$ and containing submicroscopic crystals of rutile and anatase with rutile being the predominant crystal phase;
    (c) depositing said amorphous particles onto a support; and
    (d) either essentially simultaneously with said deposition or subsequently thereto consolidating said deposit of amorphous particles into a non-porous body;
the improvement comprising utilizing as said titanium-containing compound in vapor form a halide-free, titanium-containing compound selected from the group consisting of titanium-2-ethylhexyloxide, titanium cyclopentyloxide, and a titanium amide, or a combination thereof, whereby no halide-containing vapors are emitted from said titanium-containing compound during the making of said porous body.

2. A method according to claim 1 wherein said silicon-containing compound is also halide-free.

3. A method according to claim 2 wherein said halide-free, silicon-containing compound is a polymethylcyclosiloxane.

4. A method according to claim 3 wherein said polymethylcyclosiloxane is octamethylcyclosiloxane.

5. A method according to claim 1 wherein said gas stream is comprised of natural gas and oxygen.

6. In a method for making optical waveguide fibers of high purity fused silica glass doped with titania comprising the steps of:
    (a) producing a gas stream containing a silicon-containing compound in vapor form capable of being converted through heat treatment with oxidation or flame hydrolysis to $SiO_2$ and a titanium-containing compound in vapor form capable of being converted through thermal decomposition with oxidation or flame hydrolysis to $TiO_2$;
    (b) passing said gas stream into the flame of a combustion burner to form amorphous particles of fused $SiO_2$ doped with $TiO_2$ and containing submicroscopic crystals of rutile and anatase with rutile being the predominant crystal phase;
    (c) depositing said amorphous particles onto a mandrel;
    (d) consolidating said deposit of amorphous particles into a non-porous, transparent glass body; and
    (e) drawing waveguide fiber from said body;
the improvement comprising utilizing as said titanium-containing compound in vapor form a halide-free, titanium-containing compound selected from the group consisting of titanium-2-ethylhexyloxide, titanium cyclopentyloxide, and a titanium amide, or a combination thereof, whereby no halide-containing vapors are emitted from said titania-containing compound during the making of said optical waveguide fibers.

7. A method according to claim 6 wherein said silicon-containing compound is also halide-free.

8. A method according to claim 7 wherein said halide-free, silicon-containing compound is a polymethylcyclosiloxane 9. A method according to claim 8 wherein said polymethylcyclosiloxane is octamethylcyclosiloxane.

10. A method according to claim 6 wherein said gas stream is comprised of natural gas and oxygen.

11. In a method for making optical waveguide fibers of high purity fused silica glass doped with titania comprising steps of:
    (a) producing a gas stream containing a silicon-containing compound in vapor form capable of being converted through heat treatment with oxidation or flame hydrolysis to $SiO_2$ and a titanium-containing compound in vapor form capable of being converted through thermal decomposition with oxidation of flame hydrolysis to $TiO_2$;
    (b) passing said gas stream into a flame of a combustion burner to form amorphous particles of fused $SiO_2$ doped with $TiO_2$ and containing submicroscopic crystals of rutile and anatase with rutile being the redominant crystal phase;
    (c) depositing said amorphous particles onto the surface of a bait tube;
    (d) consolidating said amorphous particles into a non-porous, transparent glass body; and
    (e) drawing waveguide fiber from said body;
the improvement comprising utilizing as said titanium-containing compound in vapor form a halide-free, titanium-containing compound selected from the group consisting of titanium-2-ethylhexyloxide, titanium cyclopentyloxide, and a titanium amide, or a combination thereof, whereby no halide-containing vapors are emitted from said titanium-containing compound during the making of said optical waveguide fibers.

12. A method according to claim 11 wherein said silicon-containing compound is also halide-free.

13. A method according to claim 12 wherein said halide-free, silicon-containing compound is a polymethylcyclosiloxane.

14. A method according to claim 13 wherein said polymethylcyclosiloxane is octamethylcyclosilane.

15. A method according to claim 11 wherein said gas stream is comprised of oxygen.

* * * * *